United States Patent [19]
Okami et al.

[11] Patent Number: 5,705,258
[45] Date of Patent: Jan. 6, 1998

[54] THERMAL CONDUCTIVE COMPOSITE SILICONE RUBBER SHEET

[75] Inventors: Takehide Okami; Tokio Sekiya, both of Annaka, Japan

[73] Assignee: Shin-Etsu Chemical Co., Ltd., Tokyo, Japan

[21] Appl. No.: 670,759

[22] Filed: Jun. 21, 1996

[30] Foreign Application Priority Data

Jun. 22, 1995 [JP] Japan .................................. 7-179374

[51] Int. Cl.$^6$ .................. B32B 5/16; B32B 9/00; B32B 15/02; B32B 17/02

[52] U.S. Cl. .................. 428/202; 428/105; 428/113; 428/142; 428/200; 428/216; 428/202; 428/221; 447/15

[58] Field of Search .................. 428/148, 208, 428/242, 328, 330, 405, 429, 447, 105, 113, 142, 200, 216, 202, 221, 266, 391; 442/15; 106/403

[56] References Cited

U.S. PATENT DOCUMENTS 4,842,911  6/1989  Fick .......................................... 428/40

*Primary Examiner*—Richard Weisberger
*Attorney, Agent, or Firm*—Cushman Darby & Cushman Intellectual Property Group of Pillsbury Madison & Sutro LLP

[57] ABSTRACT

The composite silicone rubber sheet comprises a thermal conductive silicone rubber layer, both surfaces of which are tacky, containing a thermal conductive filler such as aluminum oxide and having a Asker C hardness of 5 to 50 and a thickness of 0.4 mm or less; at least one reinforcing sheet such as glass cloth arranged within said silicone rubber layer; and a releasable protective sheet such as a release paper covered on at least one tacky surface of said silicone rubber layer. Since the composite silicone rubber sheet is superior in thermal conductivity and has a good flexibility and tackiness, when used as a heat dissipating insulation sheet, the composite silicone rubber sheet has the advantages of being superior in adherence, free of oil-bleeding, suitable for mass-production, and capable of not lowering workability in assembling electronic parts and the like. The composite silicone rubber sheet is thin and lightweight and has a superior thermal conductivity, so that it can be used in the heat dissipation of a display panel for mounting on motor vehicles, railway vehicles or aircrafts.

14 Claims, No Drawings

THERMAL CONDUCTIVE COMPOSITE SILICONE RUBBER SHEET

BACKGROUND OF THE INVENTION

1. Field of the Invention

The present invention relates to a thermal conductive composite silicone rubber sheet suitable as a heat dissipating insulation sheet for heat-generating electronic parts and the like.

2. Description of the Prior Art

Heat-generating electronic parts, such as power transistors and thyristors, and integrated circuit elements, such as IC, LSI, CPU and MPU, which parts and equipments are used in various electronic equipments, are lowered in properties due to the generation of heat and, in the case of integrated circuit elements, the generated heat also affects particularly on color liquid crystal displays, so that their arrangements in electronic equipments are taken into consideration in order to smoothly effect heat dissipation. Besides, it is also taken into consideration that, for example, specific parts or the whole instrument is forcedly air-cooled by a cooling fin and, in the case of integrated circuit elements, which have been arranged on a printed board, the generated heat is dissipated on the circuit board through a heat dissipating insulation sheet (hereinafter, referred to as heat dissipating sheet).

However, as a high integration of electronic instruments such as computers and word processors proceeds and, as a result, the amount of the heat generated at the aforementioned heat generating parts and integrated circuit elements of the instruments increases, the cooling or heat dissipation of these parts or elements may not be attained satisfactorily by the forced air-cooling method or the heat dissipating sheets conventionally used. Particularly in the case of a portable laptop type or note-book type personal computer, it requires a cooling method other than the forced air-cooling method. On the other hand, with regard to the heat dissipating sheets, those conventionally used can not dissipate satisfactorily the heat generated in the element, since a glass-reinforced epoxy resin or polyimide resin inferior in thermal conductivity is used as a material of the printed board where the element is formed. For this reason, there is employed a method in which a heat dissipating equipment such as a spontaneous-cooling type or forced cooling type heat dissipating fin or heat pipe is provided in the vicinity of the element and the heat generated therein is transferred to the heat dissipating equipment through a heat dissipating medium to dissipate the heat.

This method uses a heat dissipating, thermal conductive grease or a heat dissipating sheet having a thickness of 0.2 to 1.0 mm as a heat dissipating medium in order to improve the thermal conductivity between the element and the heat dissipating equipment. Known heat dissipating, thermal conductive greases include, for example, a thermal conductive silicone grease comprising a thermal conductive filler such as silica fibers, zinc oxide and aluminum nitride formulated in silicone oil (Japanese Patent Publication (Kokoku) No. 57-36302). However, the silicone grease causes many disadvantages such as a fear of oil-bleeding, a lowering of workability in assembling electronic parts, a lowering of thermal conductivity by the generation of voids due to heat history. On the other hand, known heat dissipating sheets include those comprising a highly filled silicone rubber layer having a high hardness reinforced with a cloth-like reinforcing material such as a glass cloth [Japanese Pre-examination Patent Publication (Kokai) No. 56-161140]. However, the heat dissipating sheet of this type has a rubber layer high in hardness [for example, 60–80 in terms of hardness measured using a spring type hardness tester type A in accordance with JIS K 6301, or 80–100 in terms of Asker C hardness measured using a spring type hardness tester type Asker C in accordance with SRIS 0101 (Standard by the Society of Rubber Industry, Japan) and JIS S 6050] and, accordingly, is poor in flexibility, so that when thermal expansion occurred therein, an integrated circuit element and a printed board, which are adjacent to the heat dissipating sheet, undergo an excess stress to cause a fear of their breakage. Thus, there has been requested a heat dissipating sheet having a good flexibility. Further, it is difficult that the heat dissipating sheet as mentioned above is prepared to have a thickness of less than 2 mm in view of strength. This also causes said heat dissipating sheet disadvantages in thermal conductivity.

Also, a composite type heat dissipating sheet comprising a thermal conductive silicone rubber sheet having a high hardness, an adhesive layer provided on one surface or both surfaces of the silicone rubber sheet, and a releasable protective sheet provided on the surface of the adhesive layer for protecting the adhesive layer is commercially available. However, the adhesive agent used therein has no thermal conductivity, so that the thermal conductivity of the heat dissipating sheet lowers as the whole composite product and, as a result, no desired heat dissipating properties can be obtained in many cases. Furthermore, while the composite type heat dissipating sheet can be produced by applying a silicone adhesive agent to a formed sheet of a silicone rubber having a high hardness by means of coating or the like, many of the adhesive agents contain a solvent and, therefore, for example, it requires not only air-drying and heat-curing steps but also a step to adhere the protective sheet for protecting the adhesive agent, whereby the production process become complicated. As a result, there occurs a problem in mass-productivity.

Still further, there is disclosed a composite type heat dissipating sheet comprising the thermal conductive silicone rubber sheet having a high hardness reinforced with a reinforcing material as mentioned above, a thermal conductive silicone rubber layer having a low hardness (5–50) in terms of Asker C hardness) laminated on said silicone rubber sheet, and a releasable protectiv-e sheet layered on the silicone rubber sheet [Japanese Patent Publication (Kokoku) No. 6-155517]. However, in the case of this heat dissipating sheet, one having a thickness (in terms of a total thickness except for the protective sheet) of 0.45 mm or less can not be obtained because of a problem on the production thereof. So, even if the thermal conductive silicone rubber layer per se having a low hardness has a good, high thermal conductivity, one which is thin as the whole composite product can not be obtained and, as a result, it has the defect of a large thermal resistance. That is, this composite sheet has a problem on the thickness.

As mentioned above, the thicker the heat dissipating sheet, the more disadvantageous the thermal conductivity thereof. However, there has not hitherto been obtained a heat dissipating sheet having a thickness of 0.2 mm or less even if a rubber of a high hardness was used, while there has not been obtained a heat dissipating sheet having a thickness of 0.45 mm or less even if a rubber of a low hardness was used. The reason is as follows. That is, in the case of the former heat dissipating sheet, upon increasing the hardness of the rubber in order to improve the strength thereof, the surface of the sheet is hardened to lower the adherence thereof to parts and elements, so that a heat dissipating sheet having a desired thermal conductivity at a thickness of 0.2 mm or less can not be obtained. While, in the case of the latter heat dissipating sheet, upon decreasing the hardness of the rubber to provide flexibility and adherence in order to improve thermal conductivity and accordingly adherence, a heat dissipating sheet having a desired strength at a thickness of 0.45 mm or less can not be obtained.

SUMMARY OF THE INVENTION

Accordingly, an object of the present invention is to provide a thin, thermal conductive composite silicone rubber sheet which is suitable as a heat dissipating sheet superior in both thermal conductivity and adherence, free of oil-bleeding, suitable for mass-production, and capable of not lowering workability in assembling electronic parts and the like.

The present invention has been completed as the result of earnest studies in order to achieve the above object. More specifically, the present invention has been completed based on the finding that upon reinforcing a tacky silicone rubber sheet having a low hardness, said sheet containing a thermal conductive filler and having an Asker C hardness of 5 to 50 and a thickness of 0.4 mm or less, with a reinforcing sheet which had a thickness of 0.05 or less as thin as possible, a thermal conductive composite silicone rubber sheet having a thickness of 0.45 mm or less suitable as a heat dissipating insulation sheet could be obtained.

Thus, the thermal conductive composite silicone rubber sheet of the present invention comprises a thermal conductive silicone rubber layer, both surfaces of which are tacky, containing a thermal conductive filler and having an Asker C hardness of 5 to 50 and a thickness of 0.4 mm or less; at least one reinforcing sheet arranged within said silicone rubber layer; and a releasable protective sheet covered on at least one tacky surface of said silicone rubber sheet.

Since the thermal conductive composite silicone rubber sheet of the present invention is superior in thermal conductivity and has a good flexibility and tackiness, when used as a heat dissipating insulation sheet, the composite silicone rubber sheet has the advantages of being superior in adherence, free of oil-bleeding, suitable for mass-production, and capable of not lowering workability in assembling electronic parts and the like. The composite silicone rubber sheet is thin and lightweight and has a superior thermal conductivity, so that it can be used in the heat dissipation of a display panel for mounting on motor vehicles, railway vehicles or aircrafts.

DETAILED DESCRIPTION OF THE PREFERRED EMBODIMENTS

The present invention will be now described in more detail.

[Thermal Conductive Composite Silicone Rubber Sheet]

The thermal conductive composite silicone rubber sheet of the present invention is basically comprised of a thermal conductive silicone rubber layer, both surfaces of which are tacky, containing a thermal conductive filler and having an Asker C hardness of 5 to 50; at least one reinforcing sheet arranged within said silicone rubber layer; and a releasable protective sheet covered on at least one tacky surface of said silicone rubber sheet. The thickness of the silicone rubber layer per se is 0.4 mm or less.

Tacky, thermal conductive silicone rubber layer

The silicone rubber layer is not particularly limited as long as it contains a thermal conductive filler and has an Asker C hardness of 5 to 50 and a thickness (thickness of the silicone rubber layer per se) of 0.4 mm or less. Concerning the thickness of the silicone rubber layer, there is the following relationship in connection with thickness of the reinforcing sheet. The thickness of the final product except for the protective sheet, that is, the total thickness of the silicone rubber layer and the reinforcing sheet is preferably 0.45 mm or less, more preferably 0.2 mm or less, and most preferably 0.15 mm or less.

The thermal conductive filler used herein may be one used in known thermal conductive resin compositions and includes, for example, aluminum oxide, boron nitride, aluminum nitride, zinc oxide, silicon carbide, silica and aluminum hydroxide. They can be used singly or in a combination of two or more thereof. The amount of the thermal conductive filler is generally 25 to 90% by weight, preferably 50 to 85% by weight, of the whole silicone rubber layer. If the amount is too small, the thermal conductivity of the thermal conductive composite sheet may be unsatisfactory, while if the amount is too large, the flexibility of the thermal conductive composite silicone rubber sheet product may be lowered.

The hardness of the silicone rubber layer is required to be 5 to 50, preferably 10 to 35, in terms of an Asker C hardness. The Asker C hardness herein means a hardness measured using a spring type hardness tester type Asker C in accordance with SRIS 0101 (Standard by the Society of Rubber Industry, Japan) and JIS S 6050. If the hardness of the silicone rubber layer is less than 5 in terms of Asker C hardness, the layer becomes so soft that it is difficult to keep the shape of the layer and also productivity is lowered. While, if the Asker C hardness is more than 50, the tackiness is lost, the layer becomes so hard that the adherence to parts is lowered and follow-up properties to the shape of the parts is decreased.

The tacky, thermal conductive silicone rubber layer as mentioned above is a cured product of an addition-curable type liquid organopolysiloxane composition as follows.

The addition curable type liquid organopolysiloxane composition is one conventionally used in the production of thermal conductive silicone rubbers. The composition is not particularly limited as long as it contains a thermal conductive filler and is such a composition that after cured, it has a hardness of 5 to 50 in terms of an Asker C hardness. Examples of the organopolysiloxane composition as above include a composition containing the following components (A) to (D):

(A) an alkenyl group-containing organopolysiloxane which contains at least two alkenyl groups per molecule, (B) an organohydrogenpolysiloxane containing at least two hydrogen atoms bonded to silicon atoms per molecule, (C) a platinum family metal catalyst, and (D) a thermal conductive filler.

Component (A):

Component (A) is represented by, for example, the following average compositional formula (1):

wherein R represents an unsubstituted or substituted monovalent hydrocarbon group, and a is a number in the range of from 1.85 to 2.15, and should have at least two alkenyl groups per molecule. This is because each of the alkenyl groups becomes a crosslink point when addition-curing and, therefore, the composition can not be cured unless basically a molecule containing at least two alkenyl groups is present. As long as the molecule has 0.5 alkenyl group on average, an organopolysiloxane having one alkenyl group per molecule such as an organopolysiloxane having an alkenyl group at only one end of the molecule or an organopolysiloxane having no alkenyl group may be contained.

In the general formula (1), the unsubstituted or substituted monovalent hydrocarbon group R includes, for example, an alkyl group such as methyl, ethyl and propyl groups; an cycloalkyl group such as cyclopentyl and cyclohexyl groups; an alkenyl group such as vinyl and allyl groups; an aryl group such as phenyl and tolyl groups; and a halogenated hydrocarbon group obtained by substituting part of hydrogens contained in said groups with halogen atoms such as chlorine atom and fluorine atom, for example, trifluoropropyl group. Particularly preferable alkenyl groups, as an essential component, relevant to said addition-curing reaction include vinyl group. Preferable groups R other than an alkenyl group include methyl, phenyl and trifluoropropyl groups.

The viscosity of component (A) is preferably 100,000 cSt or less, more preferably 500 to 30,000, at 25° C. If the viscosity is too high, the flowability of the organopolysiloxane prior to curing may be deteriorated to lower working efficiency.

Component (B):

Component (B) is comprised of a linear, branched or cyclic molecule having at least two hydrogen atoms bonded to silicon atoms per molecule. Component (B) reacts with component (A) and acts as a crosslinking agent.

The amount of component (B) is such an amount that the hydrogen atoms bonded to silicon atoms is generally 0.1 to 1.5, preferably 0.2 to 1.2, per alkenyl group contained in component (A). If the amount is too small, the crosslink density may be too low and, as a result, the resulting cured product may not have a sufficiently high strength and a sufficient heat-resistance. While, if the amount is too large, there may occur the problem of a vigorous foaming due to dehydrogenation reaction, or the resulting cured product may not have a sufficient flexibility.

Component (C):

Component (C) includes, for example, platinum black; chloroplatinic acid; an alcohol-modified product of chloroplatinic acid; and a complex of chloroplatinic acid with a compound such as olefin, vinylsiloxane and acetylene alcohol.

The amount of component (C) may be selected depending on a desired curing rate and is generally 0.1 to 500 ppm, preferably 1 to 200 ppm, in terms of the amount of a platinum family metal, based on component (A).

Component (D):

Component (D) includes, for example, the thermal conductive fillers as mentioned above.

The amount of component (D) is generally 25 to 90% by weight, preferably 50 to 85% by weight, of the total amount of the composition. If the amount is too small, a sufficient thermal conductivity may not be obtained. While, if the amount is too large, the flowability of the composition may be lowered to deteriorate workability, or the resulting cured product may be hardened and the flexibility of the resulting silicone rubber may be lowered.

Other additives

In order to control the properties, such as curing rate and storage stability, of the addition-curable type liquid organopolysiloxane composition, various additives can be, if necessary, added to the composition. Such additives include, for example, a vinyl group-containing organopolysiloxane such as methylvinylcyclotetrasiloxane; triallylisocyanurate; and acetylene alcohol and a silicone-modified product thereof.

Besides, there may be added adhesive masses, reinforcing silica, colorants, heat-resistance improvers, adhesive assistants and the like in such an amount that the effect of the present invention is not damaged.

Generally, silicone rubbers contain low molecular weight siloxanes, but it is desirable that the amount of the low molecular weight siloxanes contained is small in view of the intended uses of the present invention and is 0.5% by weight or less of the thermal conductive composite silicone rubber sheet.

The low molecular weight siloxanes are represented by cyclic siloxanes having a polymerization degree of 20 or less and are generally called Dn material wherein D stands for —$(CH_3)_2SiO$— unit. In the present invention, when the assembly of electronic parts is effected using a thermal conductive composite silicone rubber sheet containing the Dn material in an amount of more than 0.5% by weight at several places, there is the risk that if contact parts are placed adjacent to the assembled parts, a so-called contact fault occurs.

In order to control the amount of Dn materials contained in the thermal conductive composite silicone rubber sheet of the present invention to 0.5% by weight or less, it is desirable that Dn materials have been previously removed during the use of said components (A) and (B) as siloxane raw materials.

As methods for the removal of Dn materials, there are known, for example, vacuum distillation and critical extraction. Besides, the formed thermal conductive composite silicone sheet can be after-heated to remove Dn materials.

Reinforcing sheet layer

The reinforcing sheet layer has actions which provide reinforcing properties to the silicone rubber layer as above and control stretching in a direction along the plane of the thermal conductive composite silicone rubber sheet. The reinforcing sheet includes, for example, a nonwoven cloth made of, for example, a glass cloth, polyester, heat-resistant nylon, or cotton; and a porous resin film or a network film, made of, for example, polyimide resin, heat-resistant nylon or acrylic resin. Among them, preferred is a glass cloth in view of superior thermal conductivity.

The place of the reinforcing sheet to be arranged within the thermal conductive composite sheet of the present invention is not particularly limited as long as the reinforcing sheet is arranged at the upper part, the lower part and/or the vicinity of the central part (including the central part per se), of the inside of the silicone rubber layer substantially in a direction along the plane of the same layer, and preferably the reinforcing sheet is arranged at the vicinity of the central part of the silicone rubber layer. The number of the reinforcing sheet layer may be one or plurality. If the reinforcing sheet layer is arranged so that it is exposed to the surface of the silicone rubber layer, said surface becomes uneven and, as a result, the adherence to electronic parts is lowered. Therefore, it is desirable that the reinforcing sheet layer is as thin as possible. Thus, the thickness of the reinforcing sheet is preferably 0.01 to 0.15 mm, more preferably 0.01 to 0.05 mm, and most preferably 0.02 to 0.05 mm. If the thickness is smaller than 0.01 mm, the reinforcing properties may be lowered so that the production and processing of the final product are hindered and further the strength of the final product is decreased. While, if the thickness is larger than 0.15 mm, the thickness (the total thickness of the silicone rubber layer and the reinforcing sheet) of the final product except for the releasable protective sheet becomes large and, as a result, the superiority of the heat dissipating sheet of the present invention over the conventional one may be lost and may be disadvantageous in thermal conductivity.

Incidentally, in order to more improve the adhesion to the silicone rubber layer, it is desirable that the reinforcing sheet has been previously surface-treated with hydrogenpolysiloxane.

[Releasable Protective Sheet]

The releasable protective sheet is used for covering and protecting the surface of the resulting thermal conductive composite silicone rubber sheet member and is released and discarded therefrom immediately before use. The protective sheet has preferably an excellent releasability from a tacky silicone rubber cured product having a low hardness. Examples of the protective sheet include a polyethylene film (PE film), a polyethylene terephthalate film (PET film) at least one surface of which has been release-treated with a release agent such as a fluorine-containing release agent, and a paper (hereinafter, referred to as release paper) at least one surface of which has been release-treated with a release agent such as a fluorine-containing release agent. It is desirable that when a high curing temperature is required in the production process, a polyethylene film is avoided and instead thereof, a release paper having an excellent heat-resistance is used. Incidentally, when only one tacky surface of the silicone rubber layer is covered with a protective sheet both surfaces of which have been release-treated (for example, a release paper both surfaces of which have been release-treated as mentioned above) a thermal conductive composite silicone rubber sheet of the present invention can be provided as a continuous product prepared by rolling the composite sheet into a roll.

Further, when one outer surface of said silicone rubber layer is covered with a release paper one surface of which has been release-treated and the other outer surface of the silicone rubber layer is covered with a polyethylene film, it becomes easy first to release the polyethylene film, to adhere the heat dissipating sheet to parts, and then to remove the release paper, in a process of manufacturing a punched product and the like, whereby working efficiency can be improved.

[Method of Producing the Thermal Conductive Composite Silicone Rubber Sheet]

The thermal conductive composite silicone rubber sheet of the present invention can be produced by various methods as shown in Examples described later. For example, a reinforcing sheet is arranged at least one place selected from the upper part, lower part and the vicinity of the central part, of the inside of the addition curable type liquid organopolysiloxane composition layer containing a thermal conductive filler and being capable of having an Asker C hardness of 5 to 50 and a thickness of 0.4 mm or less after cured, and then press-molding said composition layer, within which the reinforcing sheet has been arranged, from on and under the composition layer while heating. Generally, it is easy to place said liquid composition so as to be spread on a plate material having a predetermined area, and to press-mold the composition from thereon and thereunder.

The conditions of the press molding may be generally those applied when curable organopolysiloxane compositions are cured and molded by press-molding and are not limited. Among said conditions, the temperature condition is preferably 50° to 200° C., and more preferably 60° to 180° C.

Among said conditions, the pressure condition may be suitably selected depending on the viscosity of the composition. Although the pressure may not be required sometimes when a composition having a good flowability is formed, it is preferred to press the organopolysiloxane composition under a pressure of generally 5 to 50 kgf/cm². The plate material as mentioned above and a framework material therefor are preferably made of a material releasable from an addition-curable type liquid organopolysiloxane composition. Such a releasing material includes, for example, a fluororesin-coated plate, Teflon (plytetrafluoroethylene) film, and a polyethylene terephthalate film (PET film) coated with a release agent such as a fluorine-containing release agent. Finally, by superimposing a sheet-like tacky formed product obtained by the press operation on a protective sheet, an intended thermal conductive composite silicone rubber sheet is obtained.

Another example of the production methods includes a dipping method. This method comprises dipping a reinforcing sheet in an addition-curable type liquid organopolysiloxane composition containing a thermal conductive filler and having a Asker C hardness of 5 to 50 after cured, which has been optionally diluted with a solvent, to coat both surfaces of the reinforcing sheet with the composition liquid, taking out the coated sheet, and then, after uniforming the thickness of the coated sheet by means of, for example, a roll or a blade if necessary, curing the same sheet by heating. Further, by superimposing the tacky surface of the resulting sheet-like tacky cured product on a protective sheet, an intended product is obtained.

Further, another example of the production methods includes a coating method. Although the coating method may be a conventionally prevailed method using a comma coater or a knife coater to coat each surface of the reinforcing sheet, a method using a kiss coater to simultaneously coat both surfaces thereof is rather preferred. After coating, the coated sheet is cured by, for example, a heated air and then, by superimposing the tacky surface of the resulting sheet-like tacky cured product on a protective sheet, an intended product is obtained.

EXAMPLES

The present invention will be now specifically described with reference to Examples. Incidentally, all parts in Examples are part by weight and all viscosity values are a value measured at 25° C.

Example 1

100 parts of a dimethylpolysiloxane (viscosity: 4000 cSt) containing 5 mol % of a methylvinylpolysiloxane unit, blocked with a trimethylsiloxy group at the end thereof; and 370 parts of aluminum oxide (produced by Showa Denko K. K. under the tradename of Alumina AS-30) were blended at 150° C. for 2 hours. After the resulting blend was cooled to room temperature, 0.3 part of a vinylcyclohexane complex (Pt content: 1% by weight) of platinic acid and 0.015 part of ethynylcyclohexanol as a control agent were added thereto and uniformly mixed. The resulting mixture was uniformly mixed with 4.8 parts of a methylhydrogenpolysiloxane represented by the formula: $H(CH_3)_2SiO[—Si(CH_3)_2O—]_{18}—Si(CH_3)_2H$ to prepare an addition-curable type liquid organopolysiloxane composition I. The composition I was heated at 150° C. for 10 minutes to form into a sheet having a thickness of 6 mm. Upon measuring the Asker C_hardness of the sheet, it was found to be 21.

The composition was coated on a PET sheet, one surface of which has been treated with a fluorine-containing release agent X-70-029B (tradename, produced by Shin-Etsu Chemical Co., Ltd.), at a thickness of 0.04 mm. Then, a glass cloth having a thickness of 0.032 mm was superimposed on the resulting first coating. Further, the composition was coated on the glass cloth at a thickness of 0.04 mm, and finally, the same treated PET sheet as above was superimposed on the resulting second coating. Then, the thus obtained sandwich-like uncured product was cured under pressure at 150° C. for 10 minutes. The properties of the cured product are shown in Table 1.

Example 2

A sandwich-like cured product was produced in the same manner as in Example 1, except that the final curing operation under pressure was replaced by an operation comprising pressing the sandwich-like uncured product by passing through between two rolls rotating at an equal speed, and then heating and curing the same in a heating furnace maintained at 150° C. for 15 minutes. The properties of the thus obtained cured product are shown in Table 1.

Example 3

The same addition-curable type liquid organopolysiloxane composition as used in Example 1 was coated on a release paper, one surface of which has been treated with a fluorine-containing release agent X-70-029B (the same as in Example 1), at a thickness of 0.1 mm, and the same manner was repeated to prepare two coated sheets. A polyester mesh cloth having a mesh of 3 mm was sandwiched between the coatings of these two coated sheets, and they were adhered each other by passing through between two rolls rotating at an equal speed. The resulting sandwich-like uncured product was heated and cured at 150° C. for 15 minutes. The properties of the thus obtained cured product are shown in Table 1.

Example 4

100 parts of a dimethylpolysiloxane (viscosity: 4,000 cSt) containing 5 mol % of a methylvinylpolysiloxane unit, blocked with a trimethylsiloxy group at the end thereof; and 150 parts of a boron nitride KBN(h)-10 (tradename of Shin-Etsu Chemical Co., Ltd.) were mixed in 150 parts of xylene. To the resulting mixture, 0.3 part of a vinylcyclohexane complex (Pt content: 1% by weight) of platinic acid and 0.015 part of ethynylcyclohexanol as a control agent were added and uniformly mixed. The resulting mixture was uniformly mixed with 5.2 parts of the same methylhydrogenpolysiloxane as used in Example 1 to prepare an addition-curable type liquid organopolysiloxane composition II. The composition II was heated at 150° C. for 15 minutes to form into a sheet having a thickness of 6 mm. Upon measuring the Asker C hardness of the sheet, it was found to be 25.

The composition II was coated on both surfaces of a glass cloth having a thickness of 0.05 mm surface-treated with KF 99 (tradename of hydrogensiloxane produced by Shin-Etsu Chemical Co., Ltd.). After the solvent contained in the resulting coated sheet was evaporated by an air heated at 60° C. using a floating method, the coated sheet was cured for 15 minutes by an air heated at 170° C. so that the temperature on the composition coated was 150° C. After cooling, the resulting cured product was rolled up while laminating a polyethylene film on one surface of the cured product, to produce a roll of a thermal conductive silicone rubber sheet.

The properties of the silicone rubber sheet are shown in Table 1.

TABLE 1

|  | Example 1 | Example 2 | Example 3 | Example 4 |
|---|---|---|---|---|
| Filler for silicone rubber | $Al_2O_3$ | $Al_2O_3$ | $Al_2O_3$ | BN |
| Reinforcing sheet | Glass cloth | Glass cloth | Polyester cloth | Glass cloth |
| Protective sheet | PET | PET | Release paper | PE film |
| Thickness (except for protective sheet) (mm) | 0.09 | 0.12 | 0.35 | 0.14 |
| Heat resistance (°C./W) | 0.09 | 0.13 | 0.27 | 0.10 |

The heat resistance in each of Examples was measured as follows.

(1) Measurement for heat resistance:

A thermal conductive composite silicone rubber sheet except for a protective sheet, as a specimen, was fixed between a power transistor (2SD217 TO-3 type) and a radiator (YWA-L120 type), and an electric current of 4 A and a voltage of 7 V were applied thereto to measure the heat resistance.

What is claimed is:

1. A thermal conductive composite silicone rubber sheet comprising a thermal conductive silicone rubber layer, both surfaces of which are tacky, having a Asker C hardness of 5 to 50 and a thickness of 0.4 mm or less; at least one reinforcing sheet arranged within said silicone rubber layer; and a releasable protective sheet covered on at least one tacky surface of said silicone rubber layer, said layer comprising a cured product of an addition-curable type liquid organopolysiloxane composition comprising A) an alkenyl group-containing organopolysiloxane having at least two alkenyl groups per molecule, B) an organohydrogenpolysiloxane having at least two hydrogen atoms bonded to silicon atoms per molecule in such an amount that the hydrogen atoms bonded to silicon atoms is 0.1 to 1.5 per alkenyl group contained in said component A), C) a platinum family metal catalyst, and D) a thermal conductive filler in an amount of 25 to 90% by weight based on the silicone rubber layer.

2. The composite silicone rubber sheet according to claim 1, wherein the reinforcing sheet is made of one material selected from the group consisting of a glass cloth, polyester, heat-resistant nylon, cotton, polyimide resin, and acrylic resin.

3. The composite silicone rubber sheet according to claim 2, wherein the reinforcing sheet is made of a glass cloth.

4. The composite silicone rubber sheet according to claim 1 containing a low molecular weight siloxane having a polymerization degree of 20 or less in an amount of 0.5% by weight or less of the composite silicone rubber sheet.

5. The composite silicone rubber sheet according to claim 1, wherein the reinforcing sheet has been arranged at least one place selected from an upper part, a vicinity of a central part, and a lower part, of the silicone rubber layer.

6. The composite silicone rubber sheet according to claim 5, wherein the place of the reinforcing sheet is the vicinity of the central part of the silicone rubber layer.

7. The composite silicone rubber sheet according to claim 1, wherein the thickness of the reinforcing sheet is in the range of 0.01 to 0.15 mm, and the total thickness of the silicone rubber layer and the reinforcing sheet is 0.45 mm or less.

8. The composite silicone rubber sheet according to claim 7, wherein the thickness of the reinforcing sheet is in the range of 0.01 to 0.05 mm.

9. The composite silicone rubber sheet according to claim 7, wherein the thickness of the reinforcing sheet is in the range of 0.01 to 0.05 mm and the total thickness of the silicone rubber layer and the reinforcing sheet is 0.2 mm or less.

10. The composite silicone rubber sheet according to claim 9, wherein the total thickness of the silicone rubber layer and the reinforcing sheet is 0.15 mm or less, and the reinforcing sheet is made of a glass cloth.

11. The composite silicone rubber sheet according to claim 1, wherein the protective sheet is one member selected from the group consisting of a polyethylene film, a polyethylene terephthalate film at least one surface of which has been release-treated, a paper at least one surface of which has been release-treated.

12. The composite silicone rubber sheet according to claim 11, wherein the protective sheet is a paper at least one surface of which has been release-treated.

13. The composite silicone rubber sheet according to claim 12, wherein the protective sheet is a paper both surfaces of which have been release-treated, and the paper has been covered on only one tacky surface of said silicone rubber layer to thereby roll the composite silicone rubber sheet into a roll.

14. The composite silicone rubber sheet according to claim 10, wherein the protective sheets are a polyethylene film and a paper one surface of which has been release-treated, and the polyethylene film has been covered on one surface of the silicone rubber layer while the paper has been covered on the other surface of the silicone rubber layer.

* * * * *